Aug. 17, 1948.  O. E. BOWLUS  2,447,111
ELECTRICAL CONTROL SYSTEM
Filed July 10, 1946  2 Sheets-Sheet 1
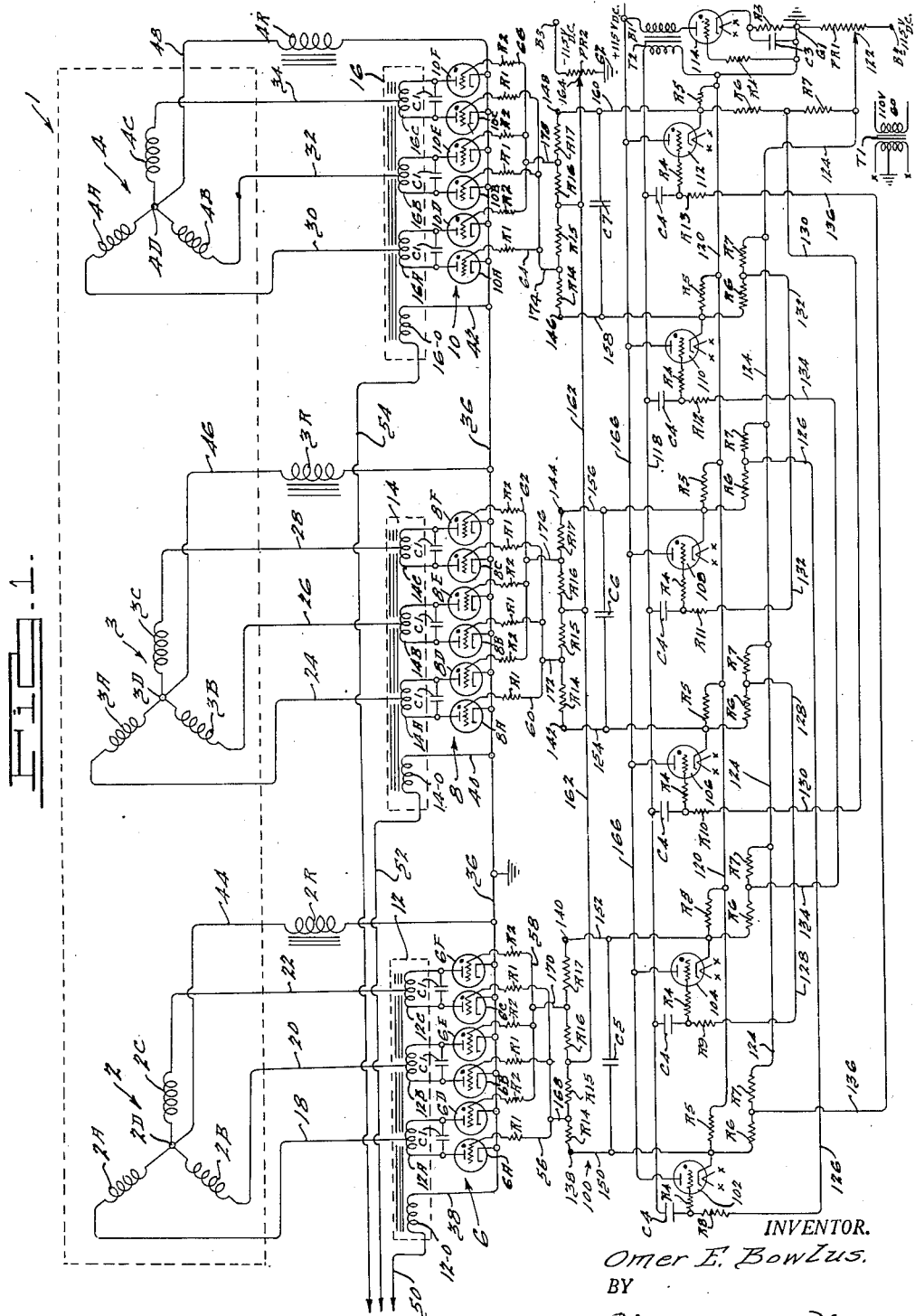
INVENTOR.
Omer E. Bowlus.
BY
Harness and Harris
ATTORNEYS.

Aug. 17, 1948.  O. E. BOWLUS  2,447,111
ELECTRICAL CONTROL SYSTEM
Filed July 10, 1946  2 Sheets-Sheet 2
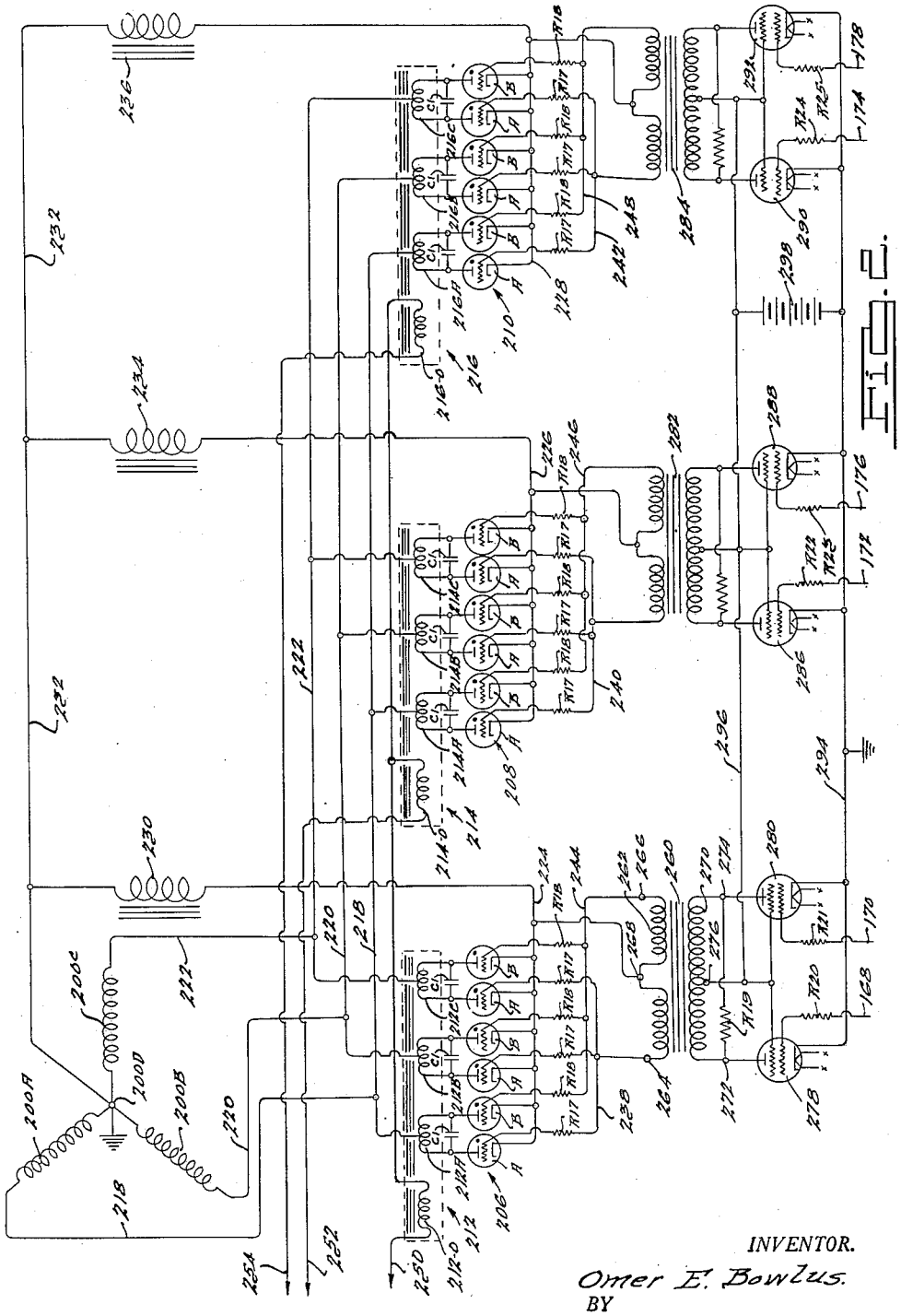
INVENTOR.
Omer E. Bowlus.
BY
Harness and Harris
ATTORNEYS.

Patented Aug. 17, 1948

2,447,111

UNITED STATES PATENT OFFICE 2,447,111

ELECTRICAL CONTROL SYSTEM

Omer E. Bowlus, Detroit, Mich., assignor to Chrysler Corporation, Highland Park, Mich., a corporation of Delaware Application July 10, 1946, Serial No. 682,485

21 Claims. (Cl. 172—281)

The present invention relates to electrical control systems and is particularly directed to the provision of improved apparatus which functions as a combination converter-inverter for transferring alternating current energy from a source of alternating current to an output alternating current system of a desired frequency, the frequency whereof and phases whereof may be equal to, less than, or greater than the number of phases and the frequency of an alternating current input system.

The principal objects of the present invention are to provide a system of the aforesaid type which is simple in arrangement, requires a minimum number of control elements, is relatively light in weight, and is reliable and efficient in operation; to provide such a system in which electronic valves are used to control the flow of energy between the input and output system; to provide such a system in which the cathodes of the electronic means supplying each phase of the output circuit may be electrically connected together; to provide in such an electronically controlled system a circuit whereby all of the cathodes of all of the electronic means may be tied together and may be grounded; and generally to improve and simplify the construction and arrangement of systems of the above generally indicated type.

With the above, as well as other and more detailed objects in view, which appear in the following description and in the appended claims, preferred but illustrative embodiments of the invention are shown in the accompanying drawings throughout the several views of which corresponding reference characters are used to designate corresponding parts, and in which Fig. 1 is a diagrammatic view of an embodiment of the invention, and Fig. 2 is a diagrammatic view of a modification of the invention.

Referring to the drawing by characters of reference, numeral 1 indicates generally a three-phase power source which may be supplied from a transmission line, an inductive generating means, or other means by which electrical energy is induced in three electrically isolated Y-connected or star-connected three-phase systems 2, 3, and 4. The secondary system 2 comprises phase windings 2A, 2B, and 2C having a common point 2D. Likewise, the secondary systems 3 and 4 comprise respectively phase windings 3A, 3B, and 3C connected together at a common point 3D and phase windings 4A, 4B, and 4C connected together to a common point 4D. Groups of electronic valves 6, 8, and 10 are associated respectively with the input systems 2, 3, and 4. Each group of electronic valves 6, 8, and 10 comprise six individual electronic valves A, B, C, D, E, and F which, for the purpose of easy identification, are prefixed by the numeral designating the group to which they belong; for example, 6A, 6B, 6C, 6D, 6E, and 6F. Each of the electronic valves of groups 6, 8, and 10 includes an anode, a cathode, and a grid, and are preferably of the gas-filled type in which the grid is ineffective to control flow of current through the valve after the valve has once been rendered conductive. Each of the group of valve means 6, 8, and 10 may be considered as being further subdivided into a pair of valve means units comprising the valves A, B, and C as one unit and the valves D, E, and F the other of the valve means unit.

Transformer units 12, 14, and 16 are associated respectively with the valve groups 6, 8, and 10. Each of these transformer units 12, 14, and 16 comprises three primary coils A, B, and C and a secondary or output coil O. The coils for each of the transformer units are prefixed with the numeral designating the transformer unit for convenience. Each of the coils A, B, and C has end connections and a center tap connection and is wound about a single iron core whereby current flowing through any of the coils A, B, and C will set up a flux in the core of the respective transformer unit 12, 14, or 16. The anodes of the valves A, B, and C are connected respectively to corresponding end connections of the primary coils A, B, and C of the transformer units with which the groups of valves are associated. Likewise, the anodes of the valves D, E, and F are connected to the opposite corresponding end connections of the transformer primary coils A, B, and C. Commutating condensers C1 are connected between the end connections of the coils A, B, and C of the transformer units 12, 14, and 16.

The center tap connection of the primary coils 12A, 12B, and 12C are connected respectively by conductors 18, 20, and 22 to the noncommon or outward ends of the windings 2A, 2B, and 2C respectively of the system 2. Likewise the center tap connection of the coils 14A, 14B, and 14C are connected by conductors 24, 26, and 28 to the noncommon or outward ends of the windings 3A, 3B, and 3C of system 3. The center tap connections of the coils 16A, 16B, and 16C are also similarly connected by means of conductors 30, 32, and 34 to the noncommon or outward ends of the windings 4A, 4B, and 4C of the system 4.

All the cathodes of the various electronic valves of the units 6, 8, and 10 are connected together to a common conductor or bus bar 36, which bus bar 36 is connected by means of conductors 44, 46, and 48 to the common points 2D, 3D, and 4D of the systems 2, 3, and 4 respectively. Interposed in series in the conductors 44, 46, and 48 are inductive reactors 2R, 3R, and 4R respectively. Bus bar 36 is also connected by means of conductors 38, 40, and 42 to corresponding end connections of the secondary coils O of the transformer units 12, 14, and 16. The opposite corresponding end connections of the output coils 12—0, 14—0, and 16—0 are connected to output conductors 50, 52, and 54 respectively which constitute the output circuit of the converter-inverter system. The grids of the valves A, B, and C of the valve group 6 are connected through resistors R1 to a common grid connection 56. The grids of the valves D, E, and F of the valve group 6 are connected through resistors R2 to a common grid connection 58. Likewise the grids of the corresponding valves of the valve groups 8 and 10 are connected similarly through resistors R1 and R2, to common grid connections 60 and 62 for group 8 and 64 and 66 for group 10.

When a grid bias voltage is applied between the bus bar 36 and the common grid conductor 56, such that the grids of the valves A, B, and C connected thereto are rendered positive with respect to the cathodes of these valves A, B, and C, some of the anodes of the valves 6A, 6B, or 6C will be at a positive potential with respect to the potential of the bus bar 36 to which all the cathodes are connected and such of the valves 6A, 6B, and 6C will be rendered conductive. When valve 6A conducts, current will flow from the winding 2A through conductor 18 through the left-hand portion of coil 12A through the valve 6A to the bus 36. Current will also flow periodically from the windings 2B and 2C through conductors 20 and 22 and the left-hand portion of coils 12B and 12C through the valves 6B and 6C to the bus 36. From the bus 36 the current flows through conductor 44 and reactor 2R to the common point of the system 2D. The current in each of the conductors 18, 20, and 22 will of course flow periodically when the anodes are positive and vary proportionally to the voltage across the windings 2A, 2B, and 2C. This flow of current through the coils 12A, 12B, and 12C will set up a flux in the iron of the transformer unit 12 which will induce a voltage into the output coil 12—0 of given polarity.

Subsequently the grids of the valves 6D, 6E, and 6F will be rendered positive with respect to the bus bar 36, and, at the same time, the grids of the valves 6A, 6B, and 6C will be rendered negative with respect to the potential of the bus 36. As soon as the current flowing through the valves 6A, 6B, and 6C is brought to zero as a result of the action of the commutating condenser C1, later to be described, in whichever of the valves 6A, 6B, and 6C happen to be conducting at the time the grids of these valves are rendered negative with respect to their cathodes, the valves will cease to conduct and will remain in a nonconductive state until their grids are again rendered positive with respect to their cathodes. The rendering of the grids of the valves 6D, 6E, and 6F positive will cause the valves to become conductive and current will flow periodically from the windings 2A, 2B, and 2C through conductors 18, 20, and 22 and the right-hand half of the primary coils 12A, 12B, and 12C, through the valves 6D, 6E, and 6F to the bus 36 and return through the conductor 44 and reactor 2R to the common point 2D. Current flow through the right-hand half of the coils 12A, 12B, and 12C will set up a flux in the iron of the transformer unit 12 in a direction opposite to the direction of the flux set up when the left-hand half of these coils are conducting, and reverse the flux cutting the coil 12—0 to induce a voltage therein of the opposite polarity. It may be seen, therefore, that the rapidity with which the common grid connections 56 and 58 are alternately rendered positive and negative with respect to the bus 36 will determine the frequency of the output voltage of the output coil 12—0.

The common grid connections 60 and 62 of the valve group 8 and the common grid connections 64 and 66 of the valve group 10 are likewise alternately and periodically rendered positive and negative with respect to the common bus 36, and so that an alternating voltage is induced in the secondary coils 14—0 and 16—0. It will be noted that these coils are connected in star or Y connection so that if the common grid connections 56, 66, 60, 58, 64, and 62 are sequentially rendered positive and negative in that order, a three-phase output will be had in the output conductors 50, 52, and 54 of the frequency of the alternate rendering of each pair of the common grid connections positive and negative.

This alternate rendering of the pairs of common grid connections 56—58, 60—62, and 64—66 positive and negative is controlled by a timing system generally designated 100. The system 100 comprises electronic valves 102, 104, 106, 108, 110, and 112 respectively for each of the common grid connections 56, 58, 60, 62, 64, and 66 and a master oscillating valve 114 which is adjusted to oscillate at a frequency which is six times the frequency of the output circuit 50, 52, and 54. The control circuit for the valves 102, 104, 106, 108, 110, and 112 is so arranged that for each cycle of the oscillating valve 114 a nonconducting valve is rendered conductive, one of the valves which was conducting is rendered nonconductive and another of the valves which was nonconducting is primed (rendered in condition so that upon the next oscillation of the oscillator valve 114 it will become conductive). At the next cycle of the valve 114 another valve will be rendered conductive, another valve will be rendered nonconductive, and still another valve will be primed, and so on for each cycle of valve 114. Three of the valves 102, 104, 106, 108, 110, and 112 will be conductive at one time. Assuming the three conductive valves to be valves 104, 108, and 110, at the next cycle of the oscillator valve 114, valve 102 will be rendered conductive, valve 104 will be rendered nonconductive, and valve 112 will be primed. At the next oscillation of the valve 114 the valve 112 will be rendered conductive, valve 110 will be rendered nonconductive, and valve 106 will be primed. The valves will be primed, rendered conductive, and rendered nonconductive in the following order: 102, 112, 106, 104, 110, and 108 with each valve being conductive for three cycles of the valve 114 and nonconductive for three cycles.

Referring more specifically to the various elements and circuit arrangements of the unit 100, the valve 114 is of the triode type having an anode, a grid, and a cathode which may be heated by a cathode heater connected as indicated by the reference numeral $x$—$x$ across the secondary, the output terminals of which are also indicated $x$—$x$, of a transformer 116 having its primary coil energized, for example, from a convenient one hundred ten-volt, sixty-cycle source. The cathode of the valve 114 is connected through a resistance R3 and a condenser C3 to a ground terminal G1, the grid is also connected through a resistance R4 to the same ground terminal G1. The anode of the valve 114 is connected to one terminal of the primary coil of a transformer T2 which has its other terminal connected to a potential source B1 such as a battery having its other terminal connected to the ground terminal G1. One terminal of the secondary coil of transformer T2 is directly connected to the ground terminal G1 and the other terminal of the secondary coil of transformer T2 is connected to a grid supplying bus 118 which is connected to each of the grids of the valves 102, 104, 106, 108, 110, and 112 through condensers C4 and resistors R4 arranged in series circuit. The terminal of the secondary coil of transformer T2 which is connected to the ground terminal G1 is also connected to a cathode bus 120. Each of the cathodes of valves 102, 104, 106, 108, 110, and 112 is connected to the bus 120 through a resistor R5. A second D. C. potential is applied by a suitable means, such as a battery, between the ground terminal G1 and a terminal B2 which is negative with respect to the ground terminal G1. The potentiometer resistor PR1 is connected between the terminals G1 and B2 and has an adjustable potential terminal 122. A bus 124 is connected to the adjustable terminal 122 and to each of the cathodes of the valves 102, 104, 106, 108, 110, and 112 through resistors R6 and R7 arranged in series. A conductor 126 having a resistor R8 in series therewith connects the junction between the resistor R4 and the condenser C4 associated with the valve 102 to the junction between the resistor R6 and the resistor R7 associated with the valve 108. A conductor 128 having a resistor R9 in series therewith connects the junction between the condenser C4 and the resistor R4 associated with the valve 104 to the junction between the resistors R6 and R7 associated with the valve 106. A conductor 130 having a resistor R10 in series therewith similarly connect the junction between the condenser C4 and the resistor R4 associated with the valve 106 to the junction between the resistor R6 and R7 associated with the valve 112. Also similarly a conductor 132 having a resistor R11 in series therewith connects the junction between the condenser C4 and the resistor R4 associated with the valve 108 to the junction of the resistor R6 and the resistor R7 associated with the valve 110. A conductor 134 having the resistor R12 connects the junction between the resistor R4 and the condenser C4 associated with the valve 110 to the junction between the resistor R6 and the resistor R7 associated with the valve 104. A conductor 136 having a resistor R13 in series therewith connects the junction between the resistor R4 and the condenser C4 associated with the valve 112 to the junction between the resistor R6 and the resistor R7 associated with the valve 102. The heaters for each of the valves 102, 104, 106, 108, 110, and 112, as indicated by the characters $x$—$x$, are energized from the secondary coil of the transformer T1 as shown by the reference characters $x$—$x$ thereon.

Associated with each of the valve groups 6, 8, and 10 are resistors R14, R15, R16, and R17 arranged in that order and in series circuit. The set of resistors R14, R15, R16, and R17 associated with the valve group 6 has end terminals 138 and 140, the set associated with the valve group 8, terminals 142 and 144, and the set associated with the valve group 10 terminals 146 and 148. Terminals 138, 140, 142, 144, 146, and 148 are connected respectively directly to the cathode of the valves 102, 104, 106, 108, 110, and 112 respectively by lead wires 150, 152, 154, 156, 158, and 160 respectively. The junctions between each of the resistors R15 and R16 are connected together by a bus connection 162 and to the variable potential terminal 164 of a potentiometer resistor PR2. One terminal of the resistor PR2 is connected to a minus potential source B3 such as the minus terminal of a battery, and the other end of the potentiometer resistor PR2 is connected to a ground terminal G2. Commutating condensers C5, C6, and C7 are respectively connected between the conductors 150—152, 154—156, and 158—160. An anode bus 166 is connected to each of the anodes of the valves 102, 104, 106, 108, 110, and 112 and to the positive potential terminal B1. The junction between the resistors R14 and R15 of the set associated with the valve group 6 is connected to the common grid connection 56 by a conductor 168. The junction between the resistors R16 and R17 associated with the same valve group 6 is connected by means of a conductor 170 to the common grid connection 58. Similarly, the junctions between the other resistors R14 and R15 are connected to the common grid connections 60 and 64 by conductors 172 and 174 respectively. Also similarly the junctions between the other resistors R16 and R17 are connected to the common grid connection 62 and 66 by conductors 176 and 178 respectively.

Referring specifically to the modification shown in Fig. 2, electrical energy is suitably inductively supplied to the star connected windings 200A, 200B, and 200C having a common junction 200D by suitable means not shown. Valve groups 206, 208, and 210 are associated with transformer units 212, 214, and 216 respectively, which transformer units are identical to the transformer units 12, 14, and 16 of Fig. 1 and have primary coils 212A, 212B, 212C; 214A, 214B, 214C; and 216A, 216B, 216C; and output coils 212—0, 214—0, and 216—0. The terminals of the windings 200A, 200B, 200C opposite the common junction 200D are connected to supply buses 218, 220, and 222 respectively. The bus 218 is connected to the center tap connection of the primary coils 212A, 214A, and 216A, the buses 220 and 222 being connected respectively to the primary coils 212B, 214B, and 216B; and 212C, 214C, and 216C. The valve groups 206, 208, and 210 may be considered as comprising valve means units consisting of the electronic valves A of the various groups and a second of the valve means unit consisting of the electronic valves identified as B valves of the various groups. The left-hand end connections of each of the primary coils of the transformer units 212, 214, and 216 are connected to the anodes of the A valves of the valve groups 206, 208, and 210 respectively, while the right-hand end connections of the primary coils of the said transformer units are connected to the anodes of the B valves of the said valve groups respectively. All the cathodes of the A and B valves of each group are connected together and respectively to cathode buses 224, 226, and 228. The bus 224 is connected through an inductive reactance 230 to a bus 232, which bus 232 is connected to the common point 200D of the star-connected windings 200A, 200B, and 200C. Similarly the cathode buses 226 and 228 are connected to the bus 232 through inductive reactances 234 and 236 respectively.

The grids of the A valves of the units 206, 208, and 210 are connected through grid resistors R217 to respective common grid connections 238, 240, and 242. The grids of the B valves of the units 206, 208, and 210 are connected through grid resistors R18 respectively to common grid connections 244, 246, and 248. Corresponding end connections of the output coils 212—0, 214—0, and 216—0 are connected together while the opposite corresponding end connections of the said output coils are connected to output buses 250, 252, and 254 respectively.

The grids of the various units of A valves and B valves are rendered positive and negative with respect to their associated cathodes by the control system 100 of Fig. 1 acting through a second set of electronic valves and transformers. For simplicity the control system 100 has not been shown in Fig. 2, but it is to be understood that it is associated therewith, and its connections to the circuits shown in Fig. 2 will be readily ascertainable in that the conductors 168, 170, 172, 174, 176, and 178 of the circuit 100 are shown in their cooperative relationship with the additional circuit elements shown in Fig. 2.

A transformer unit 260 has a center tapped secondary coil 262 having end connections 264 and 266 and a center tap connection 268. End connection 264 is connected to the common grid connection 238, while the end connection 266 is connected to the common grid connection 244. The center tap connection 268 is connected to the common cathode bus 224. The transformer 260 has a primary coil 270 having end terminals 272 and 274 and a center tap connection 276. A resistor R19 is connected across the terminals 272 and 274. The terminal 272 is connected to the anode of an electronic valve 278, while the terminal 274 is connected to the anode of an electronic valve 280. The valves 278 and 280 are preferably of the tetrode type having an anode, a cathode, a grid, and a screen grid, which screen grid acts to isolate the anode or plate from the control grid. The screen grids of the two valves 278 and 280 are connected together and to the center tap connection 276 of the primary coil 270. The grid of the valve 278 is connected through a grid resistor R20 to the conductor 168 which is the same conductor as is shown in Fig. 1. The grid of the valve 280 is connected through a grid resistor R21 to the conductor 170 of Fig. 1. Similarly the valve groups 208 and 210 have transformers 282 and 284 respectively which are identical with the transformer 260 and are similarly connected to the common grid connections 240, 242, 246, 248, and the cathode buses 226 and 228. The primary coils of the transformers 282 and 284 are connected similarly to the primary coil 270 of the transformer 260 to electronic tetrode valves 286, 288, 290, and 292, whose grids are connected through grid resistors R22, R23, R24, and R25 to conductors 172, 176, 174, and 178 respectively. All the cathodes of the valves 278, 280, 286, 288, 290, and 292 are connected to a cathode bus 294. All the screen grids of the said electronic valves are also connected together and to a bus 296. The bus 296 is maintained at a positive potential with respect to the bus 294 as by a battery 298.

The operation of the system shown in Fig. 1 is as follows: Assuming that the proper direct current potentials are applied between the terminals B1—G1, B2—G1, and B3—G2 and that a potential is being induced in the systems 2, 3, and 4, valve 114 will oscillate, placing a pulsating potential between the bus 118 and the bus 120. The potential so placed between buses 118 and 120 is not sufficient of itself to render the potential of the grid sufficiently elevated from its normal negative condition to permit the valves to fire, but when this potential is applied in conjunction with a potential defined as the priming potential (which likewise is of itself insufficient to cause the valves to conduct), the two potentials are sufficient to cause the valve to conduct. Assume an operating condition wherein valves 104, 108, and 110 are conducting and valve 102 is primed ready to be rendered conductive at the next pulse of potential between the buses 118 and 120 induced by the transformer T2. Current flowing through the valve 104 raises the potential of the junction point between the resistor R6 and resistor R7 associated therewith, and this increased potential is conducted by the conductor 134 to the grid of the valve 110 to maintain the valve 110 primed. Current flow through the conductive valve 110 raises the potential of the junction of the resistor R6 and R7 associated therewith, and this raised potential is conducted by means of conductor 132 to the grid of the valve 108 to maintain the valve 108 primed. The conduction of current through the valve 108 raises the potential of the junction point between the resistors R6 and R7 associated therewith, which increased potential is conducted by means of conductor 126 to the grid of the valve 102, which is not conducting, to prime valve 102. Conducting valve 104 was not primed and will become nonconductive at the next cycle of valve 114. The transformer T2 places a potential pulse between the buses 118 and 120, which is of itself insufficient to cause any of the grids to become enough positive with respect to their associated cathodes to cause the valve to conduct, but when such pulse is applied to a grid which has been primed or partially raised in potential with respect to its associated cathode it is sufficient to raise the potential of the grid to cause the valve to become conductive. Therefore, at the next oscillation of the valve 114 which will induce a potential of the correct polarity between the buses 118 and 120, the primed valve 102 will be rendered conductive. During the time valve 104 was conducting, the commutating condenser C5 was in a charged condition in which the condenser terminal connected to the conductor 152, and thereby to the cathode of valve 104, was at a positive potential differing only by the internal potential drop of valve 104 from the positive potential of bus 166; and the condenser terminal connected to the conductor 150, and thereby to the cathode of valve 102, was at the potential of cathode bus 120 or at a negative potential so that substantially the entire potential appearing between B1 and G1 appeared across condenser C5. When valve 102 became conductive, the cathode thereof and conductor 150 increased in potential to a positive potential differing only from the positive potential of bus 166 by the internal potential drop of valve 102. This transitorily raised the potential of the terminal of condenser C5 connected to conductor 152 and that of the cathode of valve 104 an amount equal to the increase of the other terminal. Since the cathode of valve 104 was originally operating substantially at anode potential or the potential of bus 166, the cathode potential will be raised substantially above the anode potential and valve 104 will immediately be rendered nonconductive. The capacity of condenser C5 is such that the duration of the transient is sufficient to permit valve 104 to deionize.

Current conducted by the valve 102 raises the potential of the junction between the resistors R6 and R7 associated therewith, which increased potential is conducted by means of conductor 136 to the grid of the valve 112, thereby priming the same, so that at the next potential pulse of the transformer T2 on the buses 118 and 120, the valve 112 will be rendered conductive, and, by means of the commutating condenser C7, valve 110 will be rendered nonconductive. In like manner, each time one of the valves 102, 104, 106, 108, 110, and 112 is rendered conductive, it primes another of said valves and, due to the commutating action of the condensers C5, C6, and C7, will render the valve, associated with the newly conductive valve, nonconducting. The valves 102, 104, 106, 108, 110, 112 are so interconnected with each other that they fire in the order of valves 102, 112, 106, 104, 110, and 108 and in a timed relation whereby each valve is rendered conductive sixty electrical degrees after the preceding valve is rendered conductive to provide for a three-phase output.

When the valve 102 is not conducting, the potential of its cathode and of the terminal 138 is substantially that of terminal G1. When the valve 102 is conducting, the potential of its cathode and of terminal 138 varies from the potential of the anode and terminal B1 by only the internal drop in the valve. Consequently, the conductor 168 and common grid connection 56 will be positive with respect to bus 162 when valve 102 is conducting and negative with respect to the bus 162 when the valve 102 is nonconducting. With the grids of the valves 6A, 6B, and 6C rendered positive with respect to their cathodes, they become conductive, and current flows from the windings 2A, 2B, and 2C through the conductors 18, 20, and 22 respectively, the left-hand side of the coils 12A, 12B, and 12C, the common bus 36, and the inductive reactor 2R back to the common junction 2D. This current flow through the coil 12A, 12B, and 12C sets up a flux in the iron of the transformer unit 12 to induce a voltage of one polarity in the output coil 12—0. While this is occurring valve 112 will be rendered conductive to act in a manner similar to that described with respect to valve 102 to render the valves 10D, 10E, and 10F conductive, causing current to flow from the windings 4A, 4B, and 4C through conductors 30, 32, and 34 and the right-hand half of the coils 16A, 16B, and 16C whereby a flux is induced in the iron of the transformer unit 16 which induces a voltage in the output coil 16—0 displaced 120° from that being induced in the output coil 12—0 of the transformer unit 12. At the instant the valve 112 was rendered conductive, the valve 110 was rendered nonconductive, so that only one of the common grid connections 66 or 64 will be a positive with respect to the cathode bus 32. At the next cycle of the valve 114, the valve 106 will be rendered conductive and the valve 108 will become nonconductive whereby the potential of the common grid connection 60 is raised and the potential of the common grid connection 62 is lowered with respect to the common cathode bus 36 for rendering the valves 8A, 8B, and 8C conductive. Current will then flow from the coils 3A, 3B, and 3C to the conductors 24, 26, and 28 respectively and through the left-hand half of the primary coils 14A, 14B, and 14C, setting up a flux in the transformer unit 14 which causes a voltage to be induced in the output coil 14—0 thereof and which will be displaced 120° from the voltage being induced in the coil 16—0. Similarly, at the next cycle of the valve 114, valve 104 will be rendered conductive and valve 102 will be rendered nonconductive, which action will raise the potential of the common grid connection 58 and lower the potential of the common grid connection 56 with respect to the common cathode bus 36. This will cause the valves 6D, 6E, and 6F to conduct current from the windings 2A, 2B, and 2C through conductors 18, 20, and 22 through the right-hand half of the primary coils 12A, 12B, and 12C setting up a flux in the iron of the transformer unit 12 in a direction to induce a voltage in the output coil 12—0 displaced 120° from the voltage being induced in the coil 14—0.

Each of the valve groups 6, 8, and 10, transformers 12, 14, and 16, reactors 2R, 3R, and 4R, and systems 2, 3, and 4 operate in the same manner and a detailed description of one will serve for all.

Assume an instant in which the valves 6A, 6B, and 6C have their controlling grids positively biased and the conductor 18 is more positive than conductors 20 and 22 so that valve 6A is conducting. Current flow through the left-hand half of coil 12A will set up a certain flux in the core of the transformer 12 causing an instantaneous voltage across the left-hand half of the coil 12A opposite in polarity to that of the instantaneous voltage in conductor 18 and such that the center point of the tranformer will be positive with respect to the anode of the valve 6A. Instantaneous voltages of equal magnitude and polarity to that in the left-hand half of coil 12A will be set up by the flux in the left-hand valves of the coils 12B and 12C. As the instantaneous voltages in conductor 18 decrease, the voltage of conductor 20, which is 120 electrical degrees behind that of conductor 18, becomes more positive. When these voltages are equal, valve 6B commences to conduct and the instantaneous voltage in the left-hand half of coil 12B increases along with the increasing voltage in conductor 20 in the same manner as coil 12A when valve 6A was conducting, causing the voltages in the left-hand halves of the coils 12A and 12C likewise to increase. Since the voltage in the left-hand half of the coil 12A is of opposite polarity to that of the phase 2A and is increasing while the voltage of phase 2A is decreasing, the voltage drop across the valve 6A rapidly decreases below that necessary to sustain conduction through the valve 6A and consequently the valve 6A is rendered nonconductive. Similarly the voltage of conductor 20 reaches a positive peak and then decreases. As this positive voltage decreases, the positive voltage of conductor 22 increases until it becomes equal to the positive voltage of conductor 20, at which time valve 6C commences to conduct, increasing the voltages of the left-hand half of the coils 12A, 12B, and 12C, causing the valve 6B to be rendered nonconductive in the same manner valve 6A was rendered nonconductive by the conduction of valve 6B. Similarly, at a later instant the voltage of conductor 22 decreases and that of conductor 18 increases, causing valve 6A to conduct again and valve 6C to be rendered nonconductive.

Assume now that the grids of the valves 6D, 6E, and 6F have just been positively biased and the grids of the valves 6A, 6B, and 6C have just been negatively biased and, further, that conductor 18 is more positive than conductors 20 and 22 and that valve 6A is conducting. It will be appreciated that due to the conduction of valve 6A, the right-hand side of the associated condenser C1 and anode of valve 6D are highly positive with respect to the anode of valve 6A because of the voltage across the coil 12A. Therefore, as soon as the grid of valve 6D is biased positively, valve 6D conducts and the voltage of its anode is immediately lowered to substantially that of its cathode, differing therefrom by only the voltage drop of the valve 6D. Because the charge on the commutating condenser C1 could not leak off instantaneously, the anode of the valve 6A is caused transitorily to be lowered in potential an equal amount, which made the potential of the anode of valve 6A negative with respect to its cathode and rendered the valve 6A nonconductive. Since the grids of the valves 6A, 6B, and 6C are now negatively biased, these valves will remain nonconductive. Since the center tap of the coil 12A is of lesser positive potential than the end thereof connected to the anode of the valve 6D and if the cathode of the valve 6D was maintained at the potential of the common point 2D, the potential of conductor 18 would be transitorily lowered to a negative potential and a heavy transient current would occur in the system. The reactor 2R acts under these conditions to transitorily permit the relative potential between the cathode connection 36 and the point 20 to vary. Since the potential of the connection 36 is held at ground potential, the effect of the reactor 2R is to lower the potential of the common point 20 and of the center tap of coil 12A and anode of valve 6D, thereby reducing the heavy transient or surge current through phase 2A. The inductance of reactor 2R is preferably related to the capacitance of condenser—so that the charge across the reactor 2R disappears substantially as the charge leaks off of the condenser—through the coil 12A, and the transformer reverses polarity so that the potential of the center tap connection of the coil 12A increases.

Continued oscillation of the valve 114 will sequentially render valve 110 conductive, valve 112 nonconductive, valve 108 conductive, valve 106 nonconductive, valve 102 conductive, and valve 104 nonconductive in a manner already described. It will be evident therefore that a three-phase power output supply is produced in the conductors 50, 52, and 54 in which the conductor 50 is phase 1, conductor 52 phase 2, and conductor 54 phase 3. It should be noted that in this form of the invention the bus 36 connects all the cathodes of the valves in groups 6, 8, and 10, so that all the cathodes remain at a common potential, which may be conveniently grounded to the frame of the machine with which this apparatus is associated or to actual ground, so that a person coming in contact with any of the conductors would not be shocked thereby. The common points 2D, 3D, and 4D, however, are variable in potential and float with respect to the potential of the cathode bus 36 due to the variable drop across the inductive reactors 2R, 3R, and 4R.

The modification shown in Fig. 2 works similarly to the form shown in Fig. 1, except that the cathode buses 224, 226, and 228 are tied together through the inductive reactors 230, 234, and 236 so that the potential of the bus 232 remains constant with respect to all the units and may be grounded, if desired, while the potentials of the various cathode buses 224, 226, and 228 float with respect to the potential of the bus 232 due to the variable potential drop across the inductive reactors 230, 234, and 236. Since the relative potentials of the cathode buses 224, 226, and 228 are not constant, it is necessary to insert between the control unit 100 and the common cathode connection for the valve units 206, 208, and 210 additional apparatus whereby the variation or floating of the potentials of the cathode buses 224, 226, and 228 will have no effect upon the operation of the control system.

As explained with respect to the form of the invention shown in Fig. 1, the potentials of the conductors 168, 170, 172, 176, 174, 178 with respect to the potential of the conductor 162 are periodically changed so that the conductors 178, 172, 170, 174, 176, and 168 are rendered positive in potential with respect to the conductor 162 in sequence and in the aforesaid order. This rendering of the conductor positive with respect to conductor 162 will render the grids of the valves 292, 286, 280, 290, 288, and 278 sequentially in that order positive with respect to the cathodes of the said valves so that said valves will become conductive. When the valve 280 is rendered conductive, current will flow from the positive terminal of the battery 298 through the bus 296 through the right-hand half of the primary coil 270, the valve 280 to the common cathode bus 294 back to the negative terminal of the battery 298. This will induce a flux in the iron core of the transformer 260, which in turn induces a voltage in the secondary coil 262 which has its polarity so arranged that when the right-hand half of the primary coil 270 is conductive, the common grid connection 244 will be rendered positive with respect to the common cathode bus 224, whereby the B valves of the group 206 will be rendered conductive and a voltage will be induced in the output coil 212—0 as described in connection with the form shown in Fig. 1. Similarly, when the valve 278 is conducting, current flows from the battery 298 to the left-hand portion of the primary coil 270 of the transformer 260 through the valve 278 back to the battery 298, whereby a voltage is induced in the secondary coil 262 of such polarity that the common grid connection 238 is rendered positive with respect to the common cathode connection 224, and the valves A of the valve group 206 will be rendered conductive. The valves 288, 286, 292, and 290 will similarly render the common grid connections 246, 240, 248, and 242 positive with respect to the common cathode connections associated with the common grid connections. From analogy with the forms shown in Fig. 1, the conductors 250, 252, and 254 form respectively the first, second, and third phases of a three-phase output circuit having a frequency of one-sixth that of the frequency of the oscillation of the control oscillator valve 114.

Although two preferred embodiments of the invention have been described in detail, it will be appreciated that various modifications in the form, number, and arrangement of the parts may be made without departing from the spirit and scope of the invention.

What is claimed and is desired to be secured by United States Letters Patent is as follows:

1. In a system for transferring electrical energy from a multiphase input circuit to a load circuit, a plurality of valve means having a common cathode connection and grid means and a plurality of anodes; translating means having a plurality of input circuits and an output circuit, each of said input circuits comprising a current input connection and a pair of current output connections, circuit means connecting each of said current input connections to certain of the phases of said input circuit, circuit means connecting said current output connections to said anodes, means connecting said cathode connection to said input circuit, means connecting said output circuit to said load circuit, and means for periodically biasing said grid means with respect to said common cathode connections.

2. In a system for transferring electrical energy from a multiphase input circuit to a load circuit, a pair of valve means, each of said means having a common cathode connection and grid means and a plurality of anodes, translating means having a plurality of input circuits and an output circuit, each of said input circuits comprising a current input connection and a pair of current output connections, circuit means connecting each of said current input connections to certain of the phases of said input circuit, circuit means connecting corresponding ones of said current output connections to said anodes of one of said pair of valve means, circuit means connecting the other corresponding ones of said current output connections to said anodes of the other of said pair of valve means, means connecting said cathode connections to said input circuit, means connecting said output circuit to said load circuit, and means for sequentially biasing each of said grid means with respect to its associated common cathode connections.

3. In a system for transferring electrical energy from a multiphase input circuit to a load circuit, a pair of valve means, each of said means having a common cathode connection and grid means and a plurality of anodes, translating means having a plurality of input circuits and an output circuit, each of said input circuits comprising a current input connection and a pair of current output connections, circuit means connecting each of said current input connections to certain of the phases of said input circuit, circuit means connecting corresponding ones of said current output connections to said anodes of one of said pair of valve means, circuit means connecting the other corresponding ones of said current output connections to said anodes of the other of said pair of valve means, means connecting said cathode connections together, an impedance means, circuit means connecting said common cathodes to said impedance means and said impedance means to said input circuit, means connecting said output circuit to said load circuit, and means for sequentially biasing each of said grid means with respect to its associated common cathode connections.

4. In a system for transferring electrical energy from a multiphase input circuit to a load circuit, a plurality of pairs of valve means, each pair including two anodes and two grids and a common cathode connection, translating means having a plurality of input circuits and an output connection, each input circuit having opposite end connections and a center tap connection, means connecting respective phases of said input circuit to said center tap connection, means connecting respective opposite end connections to the respective anodes of each pair of valve means, a common grid connection for the corresponding grid of each of the corresponding pairs of valve means, a second common grid connection for the other of the corresponding grid of the pairs of valve means, and means for sequentially biasing the respective common grid connection with respect to the common cathode connection.

5. In a system for transferring electrical energy from a multiphase input circuit to a load circuit, a plurality of pairs of valve means, each pair including two anodes and two grids and a common cathode connection, transformer means having a plurality of separate input coils and an output coil, each input coil having opposite end connections and a center tap connection, means connecting respective phases of said input circuit to said center tap connection, means connecting respective opposite end connections to the respective anodes of each pair of valve means, a common grid connection for the corresponding grid of each of the corresponding pairs of valve means, a second common grid connection for the other of the corresponding grid of the pairs of valve means, and means for sequentially biasing the respective common grid connection with respect to the common cathode connection.

6. In a system for transferring electrical energy from a multiphase input circuit to a multiphase load circuit, a plurality of groups of electric valve means, a translating means for each group of valve means, each translating means comprising an output coil and a plurality of center tapped input coils having end connections, circuit means connecting certain phases of said source to said center taps of the input coils of each translating means, each said group of valve means comprising a pair of valve means, each said pair of valve means having a common cathode connection and a common grid connection and anode means, means connecting corresponding end connections of the input coils of the corresponding one of said translating means to the anode means of one of said pair of valve means of the corresponding group of valve means, circuit means connecting the other corresponding end connections of the input coils of the corresponding one of said translating means to the anode means of the other pair of said valve means of the corresponding group of valve means, and means for sequentially biasing the respective common grid connections, and circuit means connecting the output coils of each translating means to a multiphase load circuit.

7. In a system for transferring electrical energy from a multiphase input circuit to a multiphase load circuit, a plurality of groups of electric valve means, a translating means for each group of valve means, each translating means comprising a single core inductive element having an output coil and a plurality of center tapped input coils with end connections, circuit means connecting certain phases of said source to said center taps of the input coils of each translating means, each said group of valve means comprising a pair of valve means, each said pair of valve means having a common cathode connection and a common grid connection and anode means, means connecting corresponding end connections of the input coils of the corresponding one of said translating means to the anode means of one of said pair of valve means of the corresponding group of valve means, circuit means connecting the other corresponding end connections of the input coils of the corresponding one of said translating means to the anode means of the other pair of said valve means of the corresponding group of valve means, and means for sequentially biasing the respective common grid connections, and circuit means connecting the output coils of each translating means to a multiphase load circuit.

8. In a system for transferring electrical energy from a multiphase input circuit to a multiphase load circuit, a plurality of groups of electric valve means of the same number as the phases in said load circuit, a transformer means for each group of valve means, each transformer means comprising a single core having an output coil and a plurality of center tapped input coils with end connections and of a number equal to one-half the number of anodes of the group of valve means to which it is connected, circuit means connecting phases of said source to each of said center taps, each said group of valve means comprising a pair of valve means, each said pair of valve means having a common cathode connection and a common grid connection and the same number of anodes as there are groups of valve means, means connecting corresponding end connections of the input coils of the corresponding one of said transformer means to the anodes of one of said pair of valve means of the corresponding group of valve means, circuit means connecting the other corresponding end connections of the input coils of the corresponding one of said transformer means to the anodes of the other pair of said valve means of the corresponding group of valve means, and means for sequentially biasing the respective common grid connections of each group of valve means, and circuit means connecting the output coils of each translating means to a multiphase load circuit.

9. In a system for transferring electrical energy from a multiphase input circuit to a multiphase load circuit, a plurality of groups of electric valve means of the same number as the phases in said load circuit, a transformer means for each group of valve means, each transformer means comprising a single core having an output coil and a plurality of center tapped input coils with end connections and of a number equal to the number of phases of said source, circuit means connecting a different phase of said source to each of said center taps of one of said transforming means, circuit means correspondingly connecting each of the other of said transformer means to said source, each said group of valve means comprising a pair of valve means, each said pair of valve means having a common cathode connection and a common grid connection and a plurality of anodes, means connecting corresponding end connections of said input coils of the corresponding one of said transformer means to the anodes of one of said pair of valve means of the corresponding group of valve means, circuit means connecting the other corresponding end connections of the input coils of the corresponding one of said transformer means to the anodes of the other pair of said valve means of the corresponding group of valve means, and means for sequentially biasing the respective common grid connections of each group of valve means, and circuit means connecting the output coils of each translating means to form a multiphase load circuit.

10. In a system for transferring electrical energy from a multiphase input circuit to a multiphase load circuit, a plurality of groups of electric valve means of the same number as the phases in said load circuit, a transformer means for each group of valve means, each transformer means comprising a single core having an output coil and a plurality of center tapped input coils with end connections and of a number equal to the number of phases of said source, circuit means connecting a different phase of said source to each of said center taps of one of said transforming means, circuit means correspondingly connecting each of the other of said transformer means to said source, each said group of valve means comprising a pair of valve means, each said pair of valve means having a common cathode connection and a common grid connection and a plurality of anodes, means connecting corresponding end connections of said input coils of the corresponding one of said transformer means to the anodes of one of said pair of valve means of the corresponding group of valve means, circuit means connecting the other corresponding end connections of the input coils of the corresponding one of said transformer means to the anodes of the other pair of said valve means of the corresponding group of valve means, and means for biasing the respective common grid connections of each group of valve means alternately and in predetermined relation with respect to each of said other groups, and circuit means connecting the output coils of each translating means to form a multiphase load circuit.

11. In a system for transferring electrical energy from a multiphase input circuit to a multiphase load circuit, a plurality of groups of electric valve means of the same number as the phases in said load circuit, a transformer means for each group of valve means, each transformer means comprising a single core having an output coil and a plurality of center tapped input coils with end connections and of a number equal to the number of phases of said source, circuit means connecting a different phase of said source to each of said center taps of one of said transforming means, circuit means correspondingly connecting each of the other of said transformer means to said source, each said group of valve means comprising a pair of valve means, each said pair of valve means having a common cathode connection and a common grid connection and a plurality of anodes, means connecting corresponding end connections of said input coils of the corresponding one of said transformer means to the anodes of one of said pair of valve means of the corresponding group of valve means, circuit means connecting the other corresponding end connections of the input coils of the corresponding one of said transformer means to the anodes of the other pair of said valve means of the corresponding group of valve means, and means for sequentially biasing the respective common grid connections of each group of valve means, a separate impedance element for each of said groups of valve means, circuit means connecting said common cathode connections of each of said groups to one terminal of the one of said impedance element associated therewith, circuit means connecting the other terminals of said impedance elements together and to said source, and circuit means connecting the output coils of each translating means to form a multiphase load circuit.

12. In a system for transferring electrical energy from a multiphase input system to a multiphase load system, a plurality of groups of valve means corresponding in number to the number of phases in the load system, each group having a separate translating means, each group of valve means comprising a pair of valve means, each pair of valve means comprising a plurality of anodes and a common cathode connection and a common grid connection, circuit means connecting all of said common cathode connections together, each translating means having a plurality of input connections and an output connection, circuit means connecting certain of said input connections to correspoding phases of said input source, circuit means connecting certain other of said input connections to the anodes of one of said valve means, circuit means connecting certain other of said input connections to the anodes of certain other of said valve means, and circuit means connecting said translating means output connections to the load system.

13. In a system for transferring electrical energy from a multiphase input system to a multiphase load system, a plurality of groups of valve means corresponding in number to the number of phases in the load system, each group having a separate translating means, each group of valve means comprising a pair of valve means, each pair of valve means comprising a plurality of anodes and a common cathode connection and a common grid connection, circuit means connecting all of said common cathode connections together, each translating means having a plurality of input connections and a pair of output connections, circuit means connecting certain of said input connections to phases of said input source, circuit means connecting certain other of said input connections to the anodes of one of said valve means, circuit means connecting certain other of said input connections to the anodes of certain other of said valve means, circuit means connecting corresponding ones of said pairs of output connections together, and means connecting the other corresponding ones of said pairs of output connections to said load system.

14. In a power transferring system, a plurality of multiphase electrical energy input circuits electrically isolated from each other, a pair of valve means for each multiphase source, each of said valve means comprising a common cathode connection and a common grid connection and a plurality of anodes, a translating means for each of said multiphase sources, each of said translating means comprising a plurality of input circuits and a load circuit, each of said input circuits having opposite end connections and a center connection, circuit means connecting certain phases of the respective multiphase sources to said center tap connections, circuit means connecting corresponding end connections of said input circuits to the anodes of corresponding ones of said pairs of valve means, circuit means connecting the other end connections of the respective input circuits to the anodes of the corresponding other ones of said pairs of valve means, circuit means for flow of current from said common cathode connections to the one of said multiphase sources to which the co-operating anodes of said common cathode connections are connected, and circuit means for connecting the output circuits of said translating means to the load circuit.

15. In a power transferring system, a plurality of multiphase electrical energy input circuits electrically isolated from each other, a pair of valve means for each multiphase source, each pair having common cathode connections, each of said valve means comprising a common grid connection and a plurality of anodes, a translating means for each of said multiphase sources, each of said translating means comprising a plurality of input circuits and a load circuit, each of said input circuits having opposite end connections and a center connection, circuit means connecting certain phases of the respective multiphase sources to said center tap connections, circuit means connecting corresponding end connections of said input circuits to the anodes of corresponding ones of said pairs of valve means, circuit means connecting the other end connections of the respective input circuits to the anodes of the corresponding other ones of said pairs of valve means, circuit means for flow of current from said common cathode connections to the corresponding one of said multiphase sources to which the corresponding valve means are connected, and circuit means for connecting the output circuits of said translating means to the load circuit.

16. In a system for controlling flow of electrical energy between a source and a multiphase load circuit, a plurality of networks, each network being individual to a phase of the load circuit and having an output circuit controlling such phase, a single controlling pulsating source for operating said networks, each network comprising a pair of valve means alternately rendered conductive for controlling the alternating flow of energy in the phase of the load circuit controlled by such network, and means interconnecting said networks whereby the potential supplied by the conducting one of said pair of valve means of one network prepares a nonconducting one of another of said pair of valve means in another network whereby said nonconducting valve means may be rendered conductive at the next pulse of said single source.

17. In a system for controlling flow of electrical energy between a source and a multiphase load circuit, a plurality of networks, each network being individual to a phase of the load circuit and having an output circuit controlling such phase, a single controlling pulsating source for operating said networks, each network comprising a pair of valve means alternately rendered conductive for controlling the alternating flow of energy in the phase of the load circuit controlled by such network, means interconnecting said networks whereby the potential supplied by the conducting one of said pair of valve means of one network prepares a nonconducting one of another of said pair of valve means in another network whereby said nonconducting valve means may be rendered conductive at the next pulse of said single source, and means actuated by the one of said valve means of said pair of valve means as it becomes conductive for rendering nonconductive the other of said valve means of said same pair of valve means.

18. In a system for controlling flow of electrical energy between a source and a multiphase load circuit, a plurality of networks, each network being individual to a phase of the load circuit and having an output circuit controlling such phase, a single controlling pulsating source for operating said networks, each network comprising a pair of valve means alternately rendered conductive for controlling the alternating flow of energy in the phase of the load circuit controlled by such network, each of said valve means having cathodes, means interconnecting said networks whereby the potential supplied by the conducting one of said pair of valve means of one network prepares a nonconducting one of another of said pair of valve means in another network whereby said nonconducting valve means may be rendered conductive at the next pulse of said single source, and means interconnecting the cathodes of said valve means of each of said pairs of valve means whereby the newly rendered conductive one of said valve means of said pair of valve means will render nonconductive the other of said valve means of said same pair of valve means.

19. In a system for controlling flow of electrical energy between a source and a multiphase load circuit, a control means for supplying a pulsating potential, a plurality of valve means for controlling the flow of energy from said source to said load circuit, each of said valve means having an anode and a grid and a cathode, a first circuit for supplying a positive potential to said anodes and a negative potential to said cathodes, a second circuit for impressing said pulsating potential between said grids and said cathodes, said pulsating potential being of itself insufficient to cause said valve means to be rendered conductive, and means associated with each of said valve means and operable upon conduction of the valve means with which it is associated to raise the potential of the grid of another of said valve means whereby said pulsating potential will render said another valve means conductive.

20. In a system for controlling flow of electrical energy between a source and a multiphase load circuit, a control means for supplying a pulsating potential, a pair of valve means for controlling the flow of energy from said source to each phase of said load circuit, each of said valve means having an anode and a grid and a cathode, a first circuit for supplying a positive potential to said anodes and a negative potential to said cathodes, a second circuit for impressing said pulsating potential between said grids and said cathodes, said pulsating potential being of itself insufficient to cause said valve means to be rendered conductive, and means associated with each of said valve means and operable upon conduction of the valve means with which it is associated to raise the potential of the grid of another of the valve means of another of said pair of valve means whereby said pulsating potential will render said another valve means conductive.

21. In a system for controlling flow of electrical energy between a source and a multiphase load circuit, a control means for supplying a pulsating potential, a pair of valve means for controlling the flow of energy from said source to each phase of said load circuit, each of said valve means having an anode and a grid and a cathode, a first circuit for supplying a positive potential to said anodes and a negative potential to said cathodes, a second circuit for impressing said pulsating potential between said grids and said cathodes, said pulsating potential being of itself insufficient to cause said valve means to be rendered conductive, means associated with each of said valve means and operable upon conduction of the valve means with which it is associated to raise the grid potential of another valve means of another of said pair of valve means whereby said pulsating potential will render said another valve means conductive, and means operable upon said another valve means becoming conductive to render nonconductive the valve means paired with said another valve means.

OMER E. BOWLUS.

REFERENCES CITED

The following references are of record in the file of this patent:

UNITED STATES PATENTS

| Number | Name | Date |
|---|---|---|
| 1,955,524 | Augier et al. | Apr. 17, 1934 |
| 1,959,188 | Willis | May 15, 1934 |
| 2,288,362 | McArthur | June 30, 1942 |